(12) United States Patent
Ishibashi (10) Patent No.: US 6,359,974 B1
(45) Date of Patent: Mar. 19, 2002

(54) COMMUNICATION RECORDS MANAGEMENT DEVICE

(75) Inventor: Masakazu Ishibashi, Nagaokakyo (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 09/256,850

(22) Filed: Feb. 24, 1999

(30) Foreign Application Priority Data

Feb. 27, 1998 (JP) ............................................. 10-090535

(51) Int. Cl.7 .............................................. H04M 11/00
(52) U.S. Cl. .................... 379/100.06; 358/442
(58) Field of Search .......... 379/100.01, 100.03–100.09; 358/400, 404, 434, 435, 438, 439, 442

(56) References Cited

FOREIGN PATENT DOCUMENTS

JP          9294198        11/1997        ............ H04N/1/32

*Primary Examiner*—Wing F. Chan
(74) *Attorney, Agent, or Firm*—Hogan & Hartson, L.L.P.

(57) ABSTRACT

A fax server connected to a plurality of client PCs and user LAN, forming a client-server system. It is also connected via an ISDN or PSTN line to a fax server of another communication network. A communication activity record which matches a reception record of receipt confirmation from a recipient with a transmission record of the transmitted document is generated and displayed on the screen of a display unit. This communication activity record can be output from printer, or displayed as printed characters.

21 Claims, 7 Drawing Sheets

COMMUNICATION RECORDS MANAGEMENT DEVICE

BACKGROUND OF THE INVENTION

1. Field of the Invention

The present invention relates to a communication records management device used in communication terminal devices such as facsimile machines or in a client-server system comprised of a plurality of data processing devices (clients), a mail server, a facsimile server and other machines connected via LANs (Local Area Networks).

2. Description of the Related Art

As communications and computer technology have developed, various forms of communication networks have been proposed. For example, a communication network which integrates a client-server system connecting a plurality of clients and a server to a LAN with PSTN (Public Subscriber Telephone Network) and/or ISDN (Integrated Service Digital Network) and transmits information is known. In such a client-server system, data processing devices like personal computers (PCs) may be used as the clients and a facsimile server device may be used as the server in order to perform facsimile communication from the data processing device (client) via the facsimile server device.

In this client-server system, facsimile data is generated at each of the data processing devices, and sent to the facsimile server device. The facsimile server device transmits the facsimile data to a remote facsimile device or a remote facsimile server device via PSTN or ISDN networks based on instructions from the data processing device. The facsimile server device also notifies the data processing devices when it receives facsimile data from remote facsimile and facsimile server devices.

Since facsimile data is comprised of image data that may include both text and pictures, the quantity of data that must be stored can become very large. Thus a memory device with large storage capacity may be required. For this reason, facsimile server devices are provided with high-capacity storage devices like hard disk drives.

The facsimile server device generates communication activity records about facsimile data transmission and reception including information such as the sender and recipient of an out-bound transmission and date/time of transmission, and the recipient and sender of an in-bound transmission and date/time of reception. These records are then stored in a storage device such as a hard disk drive. Facsimile communication data is thus managed by generating and storing these communication activity records.

Although the communication activity records in a conventional facsimile server device record facsimile communication activity (including sender, recipient, and time and date information), there is no way to verify whether or not the facsimile data is actually received by the recipient facsimile server device. Still further, it is impossible for the recipient facsimile server to confirm whether or not the designated recipient facsimile (user) has received the facsimile data.

In one known electronic mail communication system, when a document sent to a specified communication terminal device is opened at the communication terminal device of the specified recipient, receipt confirmation is automatically sent back to the communication terminal device of the sender. Yet in this case, when a large number of documents are transmitted to the same communication terminal device, receipt confirmation cannot be specified for each individual document. Although transmission reports and reception reports can be displayed at the communication terminal device in the electronic mail communication system, receipt confirmation is not directly attached to each data transmission, and therefore it is difficult and troublesome to confirm whether or not a particular transmitted document has been really received by the recipient.

When a communication terminal device receives an electronic mail, it sends back a confirmation signal and records a fact of data reception and a fact of confirmation sending in its memory, but recordation of data reception and that of confirmation sending are not related to each other in the memory. Therefore, it is difficult to know if the confirmation has been really sent to the sender in response to particular data received.

As understood from the above, a document reception confirmation means is not provided in a conventional system. Thus, the document reception status of each individual transmission cannot be determined when facsimile data and/or electronic mail documents are sent to or received from a remote communication terminal device.

SUMMARY OF THE INVENTION

It is an object of the present invention to provide a communication records management device capable of determining the document delivery status for each transmitted document when documents are sent to or received from remote communication terminal devices.

According to one aspect of the present invention, there is provided a communication records management device comprising a storage means for storing transmission records of the transmitted document and reception records generated by receiving reception confirmation of the transmitted document from a recipient; a data processing means for generating communication activity records which match the confirmation reception records with the document transmission records; and a display means for displaying the communication activity records. The reception status (receipt confirmation) for the transmitted document can be determined by referencing the communication activity records created in the communication records management device.

According to a second aspect of the present invention, a communication records management device comprises a storage means for storing a reception record of a received document and a transmission record generated when reception confirmation for the received document is transmitted; a data processing means for generating communication activity records which match the reception confirmation transmission records with the document reception records; and a display means for displaying the communication activity records. The transmission status of receipt confirmation for the received document can be determined by referencing the communication activity records created in the communication records management device.

DETAILED DESCRIPTION OF THE INVENTION

Figure 6:
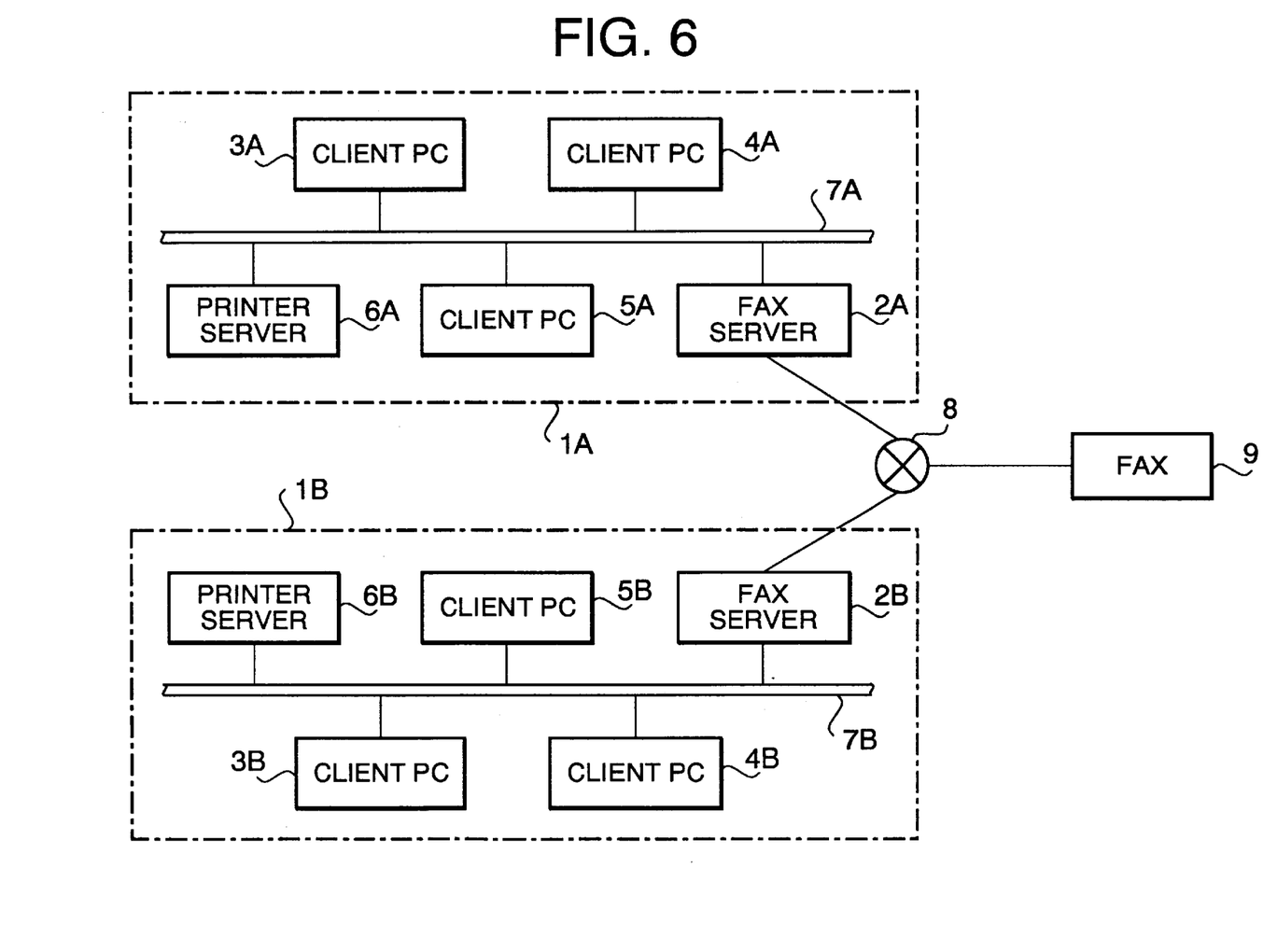
FIG. 6 illustrates an outline block diagram showing the arrangement of a system in which the communication records management device of the present invention is employed.

An embodiment of the present invention will now be described in reference to the accompanying drawings. Referring first to FIG. 6, illustrated is a block diagram of an embodiment of a system in which the communication record management device of the present invention is employed. Reference numerals 1A and 1B each represents a client server system that connects a plurality of clients and servers with user's LAN 7A/7B. In the client-server system 1A, LAN 7A connects a facsimile server device ("fax server") 2A, which is provided with the communication record management device of the present invention, client PCs 3A, 4A, and 5A and a printer server 6A.

In the client-server system 1B, LAN 7B connects a fax server 2B, client PCs 3B, 4B, 5B and a printer server 6B. These client server systems 1A and 1B may be located at, for example, a factory, an office, or a store.

A facsimile device 9 is a simple, conventional stand-alone facsimile machine. The client server systems 1A, 1B and the facsimile machine 9 are linked via a PSTN or ISDN network 8. In the system shown in FIG. 6, the fax servers 2A, 2B and facsimile machine 9, which are linked via the network 8 (PSTN or ISDN), perform facsimile communication with each other over the communication network.

In FIG. 6, facsimile data is transmitted and received between the fax servers 2A and 2B. If the fax server 2A is a data sending server which transmits facsimile data to the fax server 2B, the fax server 2A becomes the "sender" and the fax server 2B becomes the "recipient". Further, a user who logs-on at the client PC 3A and designates facsimile data for transmission becomes the "sending user", and a user who logs-on at the client PC 3B and receives the facsimile data transmission arriving by way of transmission from the fax server 2A to the fax server 2B becomes the "receiving user".

Similarly, when facsimile data is transmitted from the fax server 2B to the fax server 2A, the fax server 2B becomes the "sender" and the fax server 2A becomes the "recipient", and a user who logs-on at the client PC 3B and designates facsimile data for transmission becomes the "sending user", while the user who logs-on at the client PC 3A and receives the facsimile data transmission arriving by way of transmission from the fax server 2B to the fax server 2A becomes the "receiving user".

Figure 7:
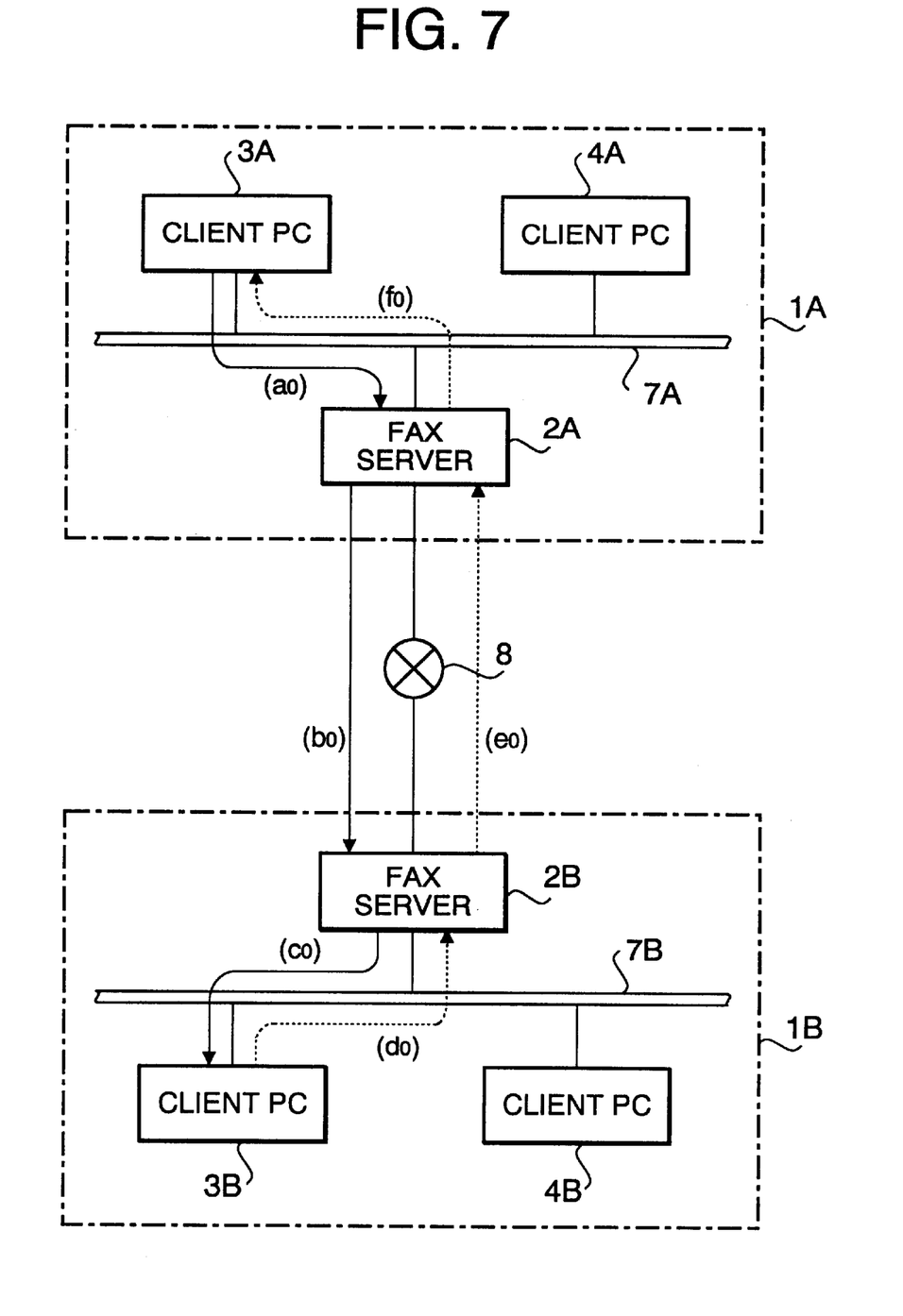
FIG. 7 illustrates an explanatory diagram showing an example of the information flow of transmission and reception between the communication networks.

Referring to FIG. 7, illustrated is a diagram showing an example of the flow of information transmitted and received between the fax servers used in the system shown in FIG. 6. In FIG. 7, the flow of information is shown moving from ($a_o$) through ($f_o$). This flow of information will now be described in detail. At ($a_o$), instructions for transmission of facsimile data to be received by the fax server 2B (the recipient) of the client-server system 1B for the client PC 3B (the receiving user) are sent from the client PC 3A (the sending user) of the client-server system 1A to the fax server 2A (the sender).

At ($b_o$), the fax server 2A transmits the facsimile data via the ISDN/PSTN line 8 to the recipient fax server 2B. At this time, the fax server 2A also requests transmission of reception confirmation from the recipient fax server 2B. At ($c_o$), the fax server 2B notifies the recipient client PC 3B of the reception of facsimile data. When the contents of the facsimile data are checked by the recipient user at the client PC 3B, the client PC 3B notifies the fax server 2B of the reception of facsimile data, as indicated by ($d_o$)

At ($e_o$), the fax server 2B transmits facsimile data reception confirmation to the fax server 2A via the PSTN/ISDN line 8. At ($f_o$), the fax server 2A notifies the sending user's client PC 3A of the receipt confirmation by the fax server 2B.

In the example shown in FIG. 7, the fax server 2B delivers the facsimile data to the client PC 3B, i.e., the recipient user. Upon receiving the facsimile data reception notification from the client PC 3B, the fax server 2B transmits the reception confirmation to the fax server 2A, i.e., the sender.

Figure 1:
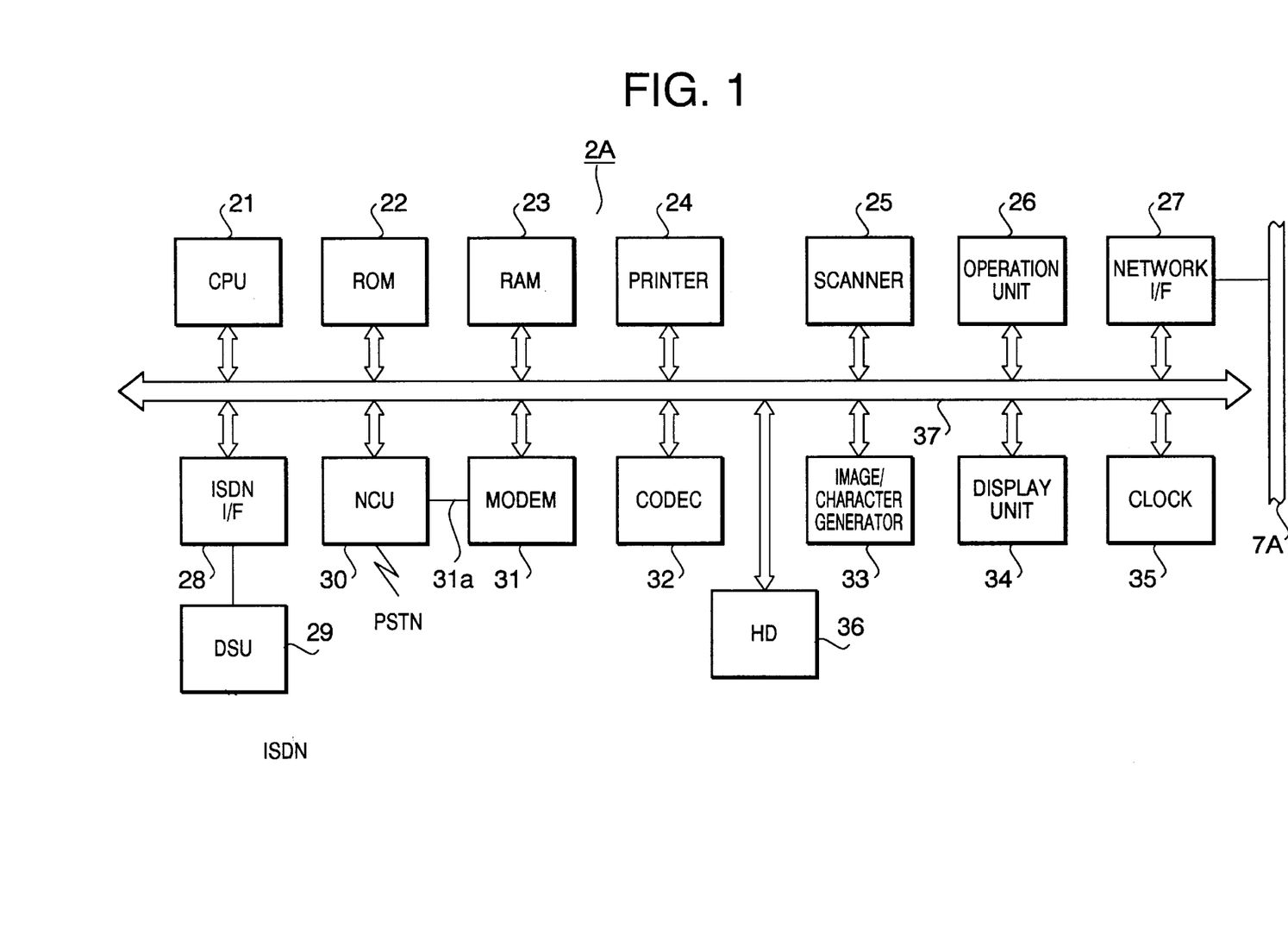
FIG. 1 illustrates a block diagram showing a facsimile server device, which is a communication records management device according to the present invention.

Referring now to FIG. 1, illustrated is a block diagram of an example of the structure of the fax server 2A/2B shown in FIGS. 6 and 7 equipped with the communication record management device of the present invention. In FIG. 1, CPU 21 processes various data and signals, ROM 22 stores data and programs required to perform the various operations of the fax server 2A/2B, and RAM 23 stores administrative or management data and the like.

A printer 24 outputs received facsimile data onto recording sheets, a scanning unit 25 scans a document and outputs facsimile data as binary black and white image data, and an operational unit 26 is comprised of a keyboard, a mouse, or the like. The fax server 2A/2B is connected to LAN 7A/7B via a network interface 27.

Further, the fax server 2A/2B is connected to the ISDN line via the ISDN interface 28, and Digital Service Unit (DSU) 29. The fax server 2A/2B is also be connected to the PSTN line via Network Control Unit (NCU) 30. A modem 31 modulates and demodulates facsimile data sent and received over the PSTN line connecting a remote facsimile device, and the modem 31 and NCU 30 are connected with an analog signal line 31$a$.

CODEC (Coder/Decoder) 32 encodes facsimile data for transmission, and decodes facsimile data that is received. A graphics/character generating unit 33 converts character coded data into image data. A display unit 34 employs either a Cathode Ray Tube (CRT) or Liquid Crystal Display (LCD). A clock 35 is used for incorporating the time and date into facsimile data, and a hard drive (HD) 36 stores communication activity records and facsimile data. Reference numeral 37 designates an internal BUS.

The facsimile server 2A/2B stores facsimile data in a specified storage area of the hard disk 36 in such a manner that the facsimile data correspond to the communication activity records. In the present invention, the communication activity records are generated, recorded and displayed to match the reception status of reception confirmation to the facsimile data transmission records, and the communication activity records are also generated, recorded and displayed to match transmission status of reception confirmation to facsimile data reception records. These data processing are performed by CPU 26.

Figure 2:
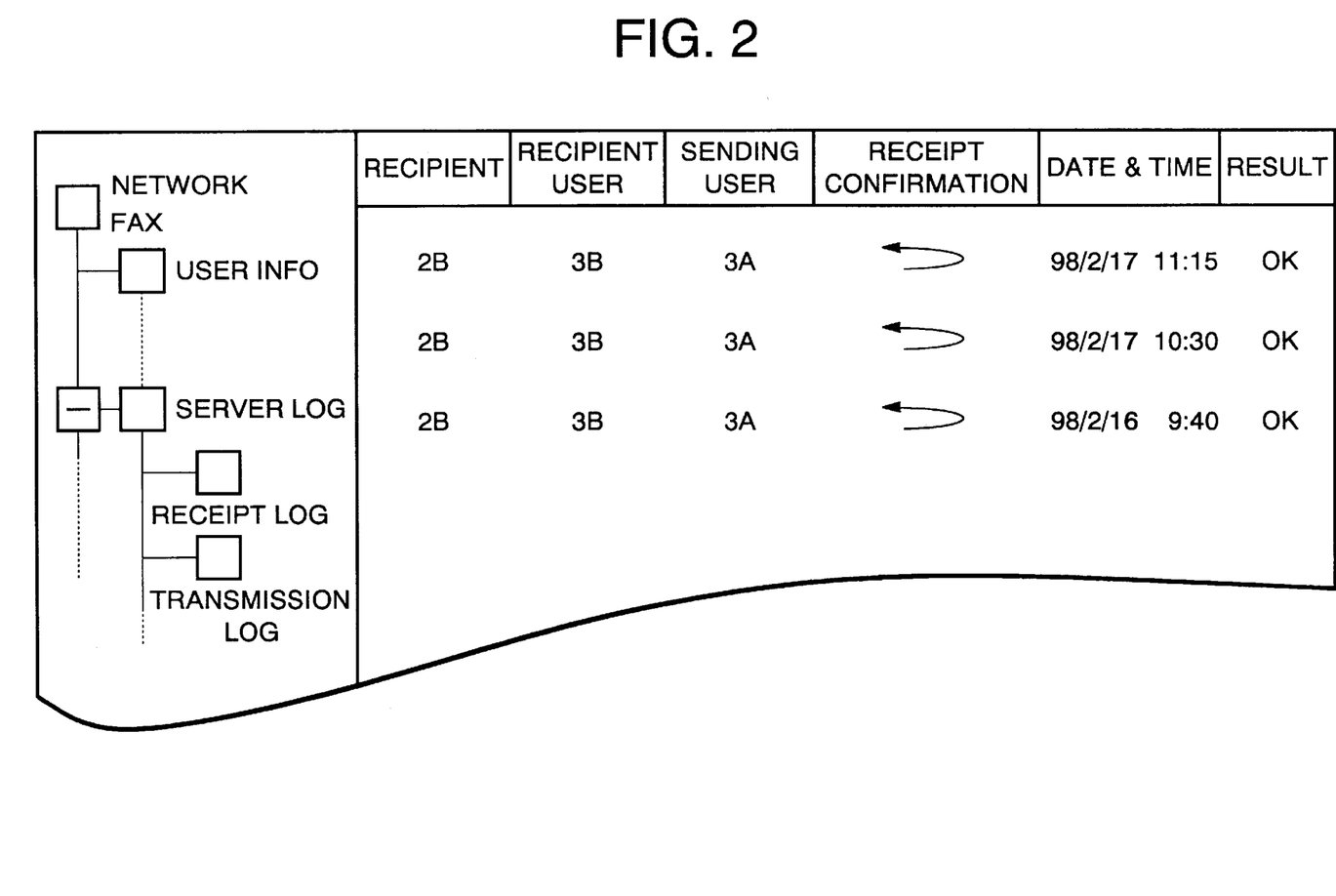
FIG. 2 illustrates an explanatory diagram showing the display of receipt confirmation in the facsimile server device of FIG. 1.

Referring to FIG. 2, illustrated is a diagram showing an example of the reception confirmation shown on the display unit of the sending fax server 2A. The column at the left of the diagram shows the folder tree for this data. In FIG. 2, a communication activity record is formed by matching the reception status of reception confirmation with its facsimile data transmission record. By selecting the transmission log folder via a mouse or the like of the operational unit 26, the information headers "recipient", "receiving user", "sending user", "receipt confirmation", "date and time", and "result" are shown on the display unit.

Underneath the column headings, the communication activity record displays information for each item in the order of transmission, from the most recently transmitted to the earliest transmitted facsimile data. Display of the "recipient", "receiving user", and "sending user" correspond to the example shown in FIG. 6.

In FIG. 2, when the sending fax server 2A transmits facsimile data to the fax server 2B and facsimile data reception confirmation is sent back from the fax server 2B, these facts are recorded in the reception log and corresponding transmission log of the fax server 2A respectively. Receipt of the reception confirmation is indicated by the arrow mark in the diagram.

Figure 3:
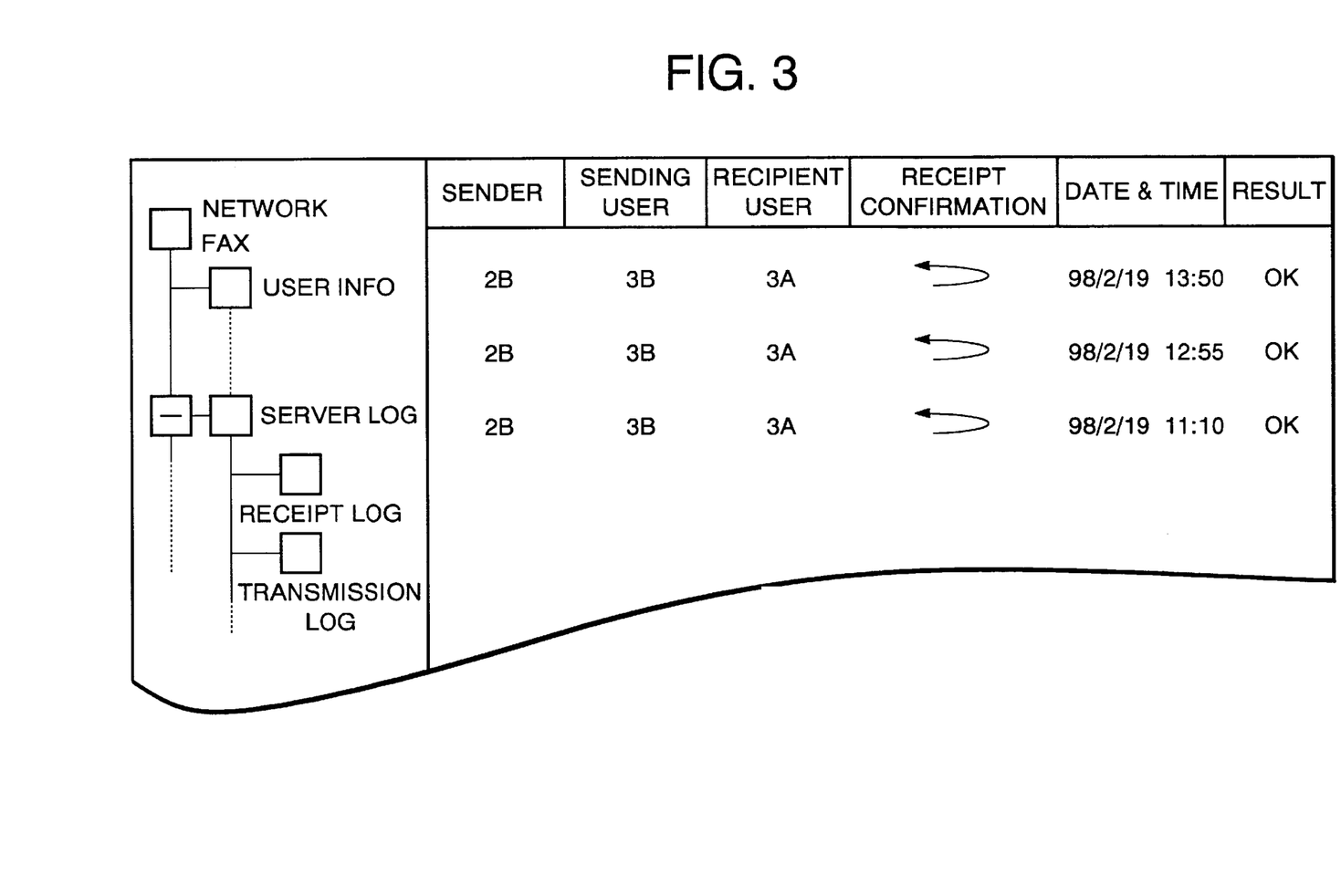
FIG. 3 illustrates an explanatory diagram showing an alternate display of receipt confirmation in the facsimile server device of FIG. 1.

Referring to FIG. 3, illustrated is an example of the display screen of the fax server 2A when the fax server 2A receives facsimile data from the fax server 2B. The reception confirmation is displayed on the display unit of the fax server 2A. In FIG. 3, the communication activity record is formed by matching the transmission status of reception confirmation with its facsimile data reception record. By selecting the reception log folder via a mouse or the like of the operational unit 26, the information headers "sender", "sending user", "recipient user", "receipt confirmation", "date and time", and "result" are shown on the display unit.

On the display below the column headings, the communication activity records of each item is displayed in the chronological order (from most recent to oldest transmission) in which the facsimile data was received. Display of the "sender", "sending user", and "recipient user" correspond to the example shown in FIG. 6.

Figure 4:
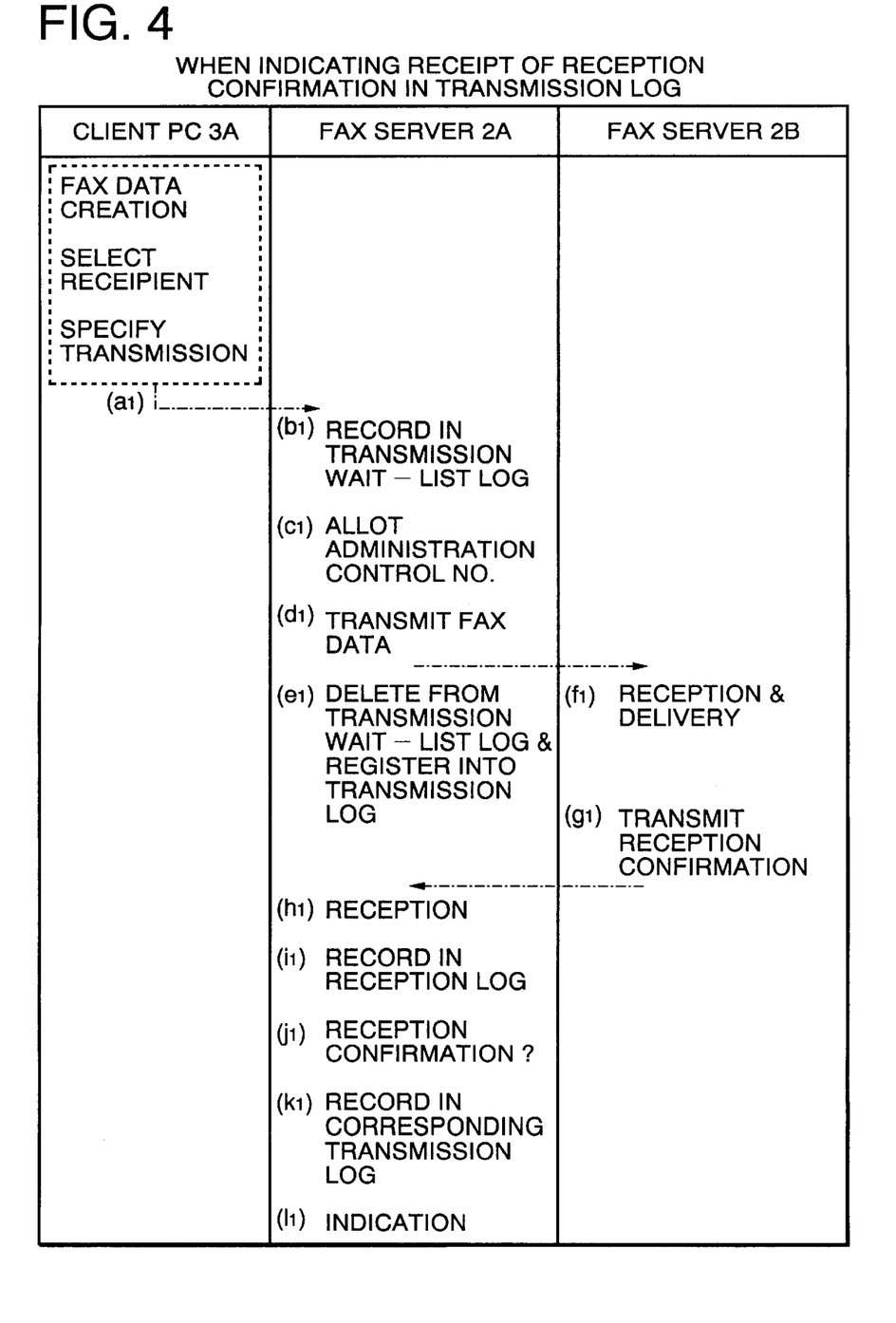
FIG. 4 illustrates an explanatory diagram of the sequence of steps through which receipt confirmation is indicated in the transmission log.

If the recipient fax server 2A receives the facsimile data from the sending fax server 2B, it delivers the facsimile data to the client PC (or recipient user) 3A, and transmits receipt confirmation to the sending fax server 2B. Then, transmission of the receipt confirmation is recorded in the transmission log and the corresponding reception log. The recordation is indicated by the arrow mark in the diagram of FIG. 3. FIG. 4 is a diagram showing the sequence ($a_1$) through ($l_1$) indicating receipt confirmation in the transmission log of transmitting fax server 2A. The sequence of events in FIG. 4 will now be described. At ($a_1$), the client PC 3A of the sending user prepares the original facsimile data, selects the client PC 3B of the receiving user, and instructs the sending fax server 2A to transmit the data.

At ($b_1$), the sending fax server 2A records onto the transmission wait list the communication activity record of facsimile data specified for transmission. At ($c_1$), an administrative control number is assigned to the facsimile data and matched with the communication activity record. At ($d_1$), the facsimile data to which the administrative control number has now been appended is transmitted to the recipient fax server 2B. Next, at ($e_1$), the communication activity record of the facsimile data appended with the administrative control number is deleted from the transmission wait list and recorded in the transmission log.

At ($f_1$), the recipient fax server 2B receives the facsimile data and delivers it to the recipient user's client PC 3B. When notification is received from the recipient user's client PC 3B that the facsimile data has been received, then at ($g_1$) the recipient fax server 2B sends to the sending fax server 2A receipt confirmation specifying the administrative control number appended to the facsimile data received from the sending fax server 2A.

At ($h_1$), the sending fax server 2A receives either facsimile data or receipt confirmation, and at ($i_1$) records it in the reception log, Next, at ($i_1$), it is determined whether or not receipt confirmation has been received. Processing at ($j_1$) confirms not whether or not facsimile data was received at ($h_1$), but rather whether or not facsimile data reception confirmation was received. If there is reception confirmation then the program proceeds to ($k_1$); but if instead facsimile data is received, processing proceeds in the same manner as that which occurs after ($f_2$) of FIG. 5. This processing is described below, so a detailed explanation is now omitted.

At ($k_1$), based upon the administrative control number specified in the received reception confirmation, the sending fax server 2A finds out one communication activity record among a plurality of records made in the transmission log, and records receipt of the reception confirmation in the communication activity record to which the administrative control number is allotted. At ($l_1$), the reception confirmation arrow mark is placed.

To summarize, the sending fax server 2A appends an administrative control number to the facsimile data and transmits it to the fax server 2B. The receiving fax server 2B sends receipt confirmation with the specified administrative control number back to the fax server 2A. This enables the sending fax server 2A to determine for which one of the plurality of communication activity records stored in the transmission log this reception confirmation has been sent. The administrative control number is unique to each facsimile data transmission.

In the illustrated embodiment, transmission of receipt confirmation from the recipient fax server 2B to the sending fax server 2A takes place when receipt of the facsimile data is verified by the recipient fax server 2B at ($g_1$), but receipt confirmation may be transmitted to the sending fax server 2A from the recipient fax server 2B in the form of polling transmission in response to regular inquiry from the sending fax server 2A.

Figure 5:
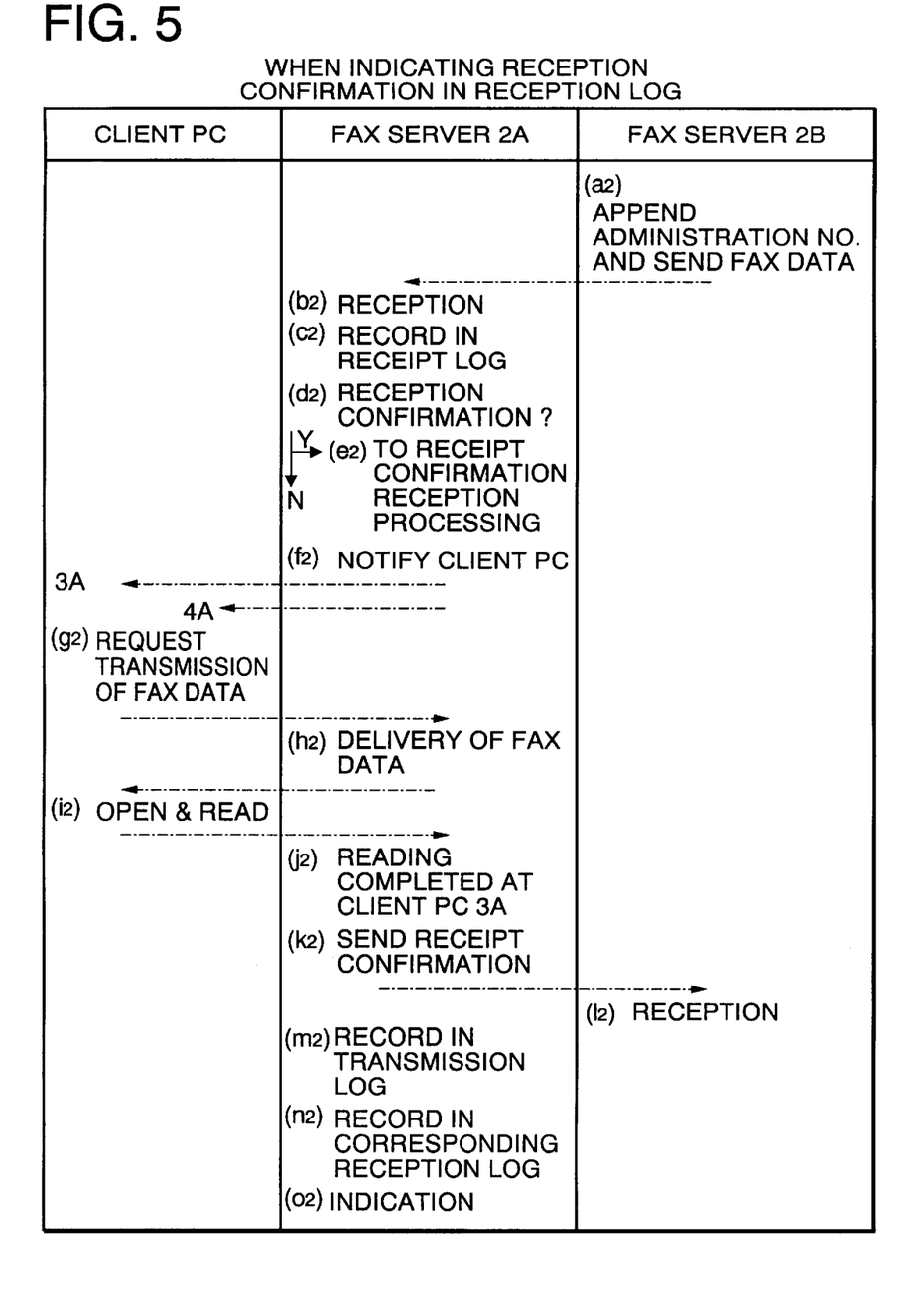
FIG. 5 illustrates an explanatory diagram showing the sequence of steps through which receipt confirmation is indicated in the reception log.

FIG. 5 is a diagram showing the sequence of steps ($a_2$) through ($o_2$) performed by the fax server 2A which receives facsimile data from the fax server 2B (FIG. 3) whereby receipt confirmation is indicated in the reception log of the fax server 2A. The sequence of events shown in FIG. 5 will now be described. At ($a_2$), the fax server 2B attaches the administrative control number to the facsimile data and sends it to the recipient fax server 2A. At ($b_2$) the recipient fax server 2A receives the facsimile data with the appended administrative control number, and at ($c_2$) records the event in the reception log.

At ($d_2$), the recipient fax server 2A determines whether or not the data received is facsimile data or reception confirmation. If it is receipt confirmation that has been received, then processing continues (from $e_2$) in the same manner as at ($k_1$) in FIG. 4. (A detailed explanation is thus now omitted.) On the other hand, if the data received is not receipt confirmation but facsimile data, notification that facsimile data has been received is sent to the recipient user client PC 3A or 4A (step $f_2$) connected via the fax server 2A and LAN 7A.

Processing occurs individually between each of the plurality of recipient user client PCs 3A, 4A and fax server 2A, but as an example of this processing, the processing between the client PC 3A and fax server 2A is now described. At ($g_2$), the client PC 3A requests the facsimile data from the fax server 2A. At ($h_2$), the fax server 2A delivers to the client PC 3A the facsimile data to which an administrative control number has been appended.

At ($i_2$), the client PC 3A opens and reads the facsimile data. After reading the facsimile data, the client PC 3A notifies the fax server 2A of such a fact together with the administrative control number. At ($j_2$), the fax server 2A receives notification from the client PC 3A that the facsimile data has been read by the client PC 3A, and at ($k_2$), transmits to the sending fax server 2B confirmation of receipt of the facsimile data specifying the administrative control number.

At ($l_2$), the sending fax server 2B receives the reception confirmation. At ($m_2$), the receiving fax server 2A records in its transmission log a fact that receipt confirmation has been sent, and at ($n_2$) records in its reception log a fact that receipt confirmation has been sent. A location of recordation is determined by the administrative control number received from client PC 3A. At ($o_2$), the receipt confirmation indication is made.

The receiving fax server 2A transmits to the client PC 3A the administrative control number and facsimile data received from sending fax server 2B, and the client PC 3A opens the facsimile data and sends the administrative control number to the recipient fax server 2A. Thus the recipient fax server 2A is enabled to determine for which one of the plurality of communication activity records recorded in the reception log the receipt confirmation has been sent to the fax server 2B.

The notification from the recipient user client PC 3A/4A to the recipient fax server 2A that the facsimile data has been read by the user client PC takes place at the point when the facsimile data is opened (or has been read), or when the user client PC performs polling transmission in response to regular inquiry from the recipient fax server 2A. Which approach should be taken is instructed to the recipient user PC at the time of facsimile data transmission.

In the described embodiment, the receipt confirmation indication mark is shown on the screen of the display unit of the fax server 2A, but receipt confirmation can also be indicated by output via the printer 24. It is also possible to display more detailed information about receipt confirmation including information such as "read", "unread", and "time out". Further still, when facsimile data is delivered to a plurality of recipient users, receipt confirmation may be indicated for each of the individual recipient users, or alternatively, receipt confirmation of all individual recipient users may be shown together after confirming that all the users have received the facsimile data.

The processing shown in FIGS. 4 and 5 is an example of processing that takes place when a facsimile server device is used as a communication record management device, but the present invention is not limited to only this example. The concept of the present invention in which the reception status of a document is determined for each transmission by matching the transmission record of the transmitted document with the recording of reception of confirmation from a remote device and matching the reception record with the recording of transmission of confirmation to a remote device in the communication activity record is also applicable to, for example, an electronic mail system in which documents are sent and received via electronic mail.

The communication records management device illustrated and described above is disclosed in Japanese Patent Application No. 10-90535 filed Feb. 27, 1998 and the entire disclosure thereof is incorporated herein by reference. The application claims priority of this Japanese Patent Application.

What is claimed is:

1. A communication records management device comprising:

first storage means for storing a transmission record of a transmitted message;

second storage means for storing a reception record of a received reception confirmation;

generating means for generating a communication activity record matching the transmission record with the reception record; and output means for indicating the communication activity record.

2. The communication records management device of claim 1, wherein the generating means generates the communication activity record by using an administrative number appended to the message.

3. The communication records management device of claim 1, wherein the message is facsimile data.

4. A communication records management device comprising:

first storage means for storing a reception record of a received message;

second storage means for storing a transmission record of a transmitted reception confirmation;

generating means for generating a communication activity record matching the reception record with the transmission record; and output means for indicating the communication activity record.

5. The communication records management device of claim 4, wherein the generating means generates the communication activity record by using an administrative number appended to the message.

6. The communication records management device of claim 4, wherein the message is facsimile data.

7. A communication records management device comprising:

first generating means for generating a first distinguishing code particular to each transmission;

transmission means for transmitting the first distinguishing code together with a first message;

second generating means for generating a transmission record based on first message transmission;

means for receiving a second message and extracting a second distinguishing code;

third generating means for generating a reception record based on second message reception;

comparing means for comparing the first distinguishing code with the second distinguishing code; and matching means for matching the transmission record and reception record based on the result of comparison by the comparing means.

8. The communication records management device of claim 7, wherein each of the first and second distinguishing codes is a serial number.

9. The communication records management device of claim 7, wherein the message is facsimile data.

10. A communication records management device comprising:

means for receiving a message and extracting a distinguishing code;

first generating means for generating a reception record based on message reception;

transmission means for transmitting a message with the distinguishing code;

second generating means for generating a transmission record based on message transmission; and matching means for matching the reception record and transmission record based on the distinguishing code.

11. The communication records management device of claim 10, wherein the message transmission is performed based upon a display, print-out or output to another terminal of the received message.

12. The communication records management device of claim 10, wherein the distinguishing code is a serial number.

13. The communication records management device of claim 10, wherein the message is facsimile data.

14. A system comprising a first device and a second device, the first device including:

first generating means for generating a first distinguishing code particular to each of transmissions to be made to the second device, first transmission means for transmitting the first distinguishing code together with a first message to the second device, second generating means for generating a first transmission record based on first message transmission, first receiving means for receiving a second message from the second device and extracting a second distinguishing code sent from the second device, third generating means for generating a first reception record based on second message reception, comparing means for comparing the first distinguishing code with the second distinguishing code, and first matching means for matching the first transmission record and first reception record based on the result of comparison by the comparing means; and a second device including:

second receiving means for receiving the first message from the first device and extracting the first distinguishing code, fourth generating means for generating a second reception record based on first message reception, second transmission means for transmitting the second message with the second distinguishing code to the first device, fifth generating means for generating a second transmission record based on second message transmission, and second matching means for matching the second reception record and second transmission record.

15. The system of claim 14, wherein each of the first and second distinguishing codes is a serial number.

16. The system of claim 14, wherein the first message is facsimile data.

17. The system of claim 14, wherein the second message transmission is performed based upon displaying, printing-out or outputting of the message to another terminal of the received message.

18. The system of claim 14, wherein the second device uses the first distinguishing code received from the first device as the second distinguishing code to be sent back to the first device.

19. A system comprising a first device and a second device, the first device including:

first storage means for storing a first transmission record of a message sent to the second device, second storage means for storing a first reception record of a reception confirmation sent from the second device in response to the message, first generating means for generating a first communication activity record matching the first transmission record with the first reception record, and first output means for indicating the first communication activity record; and the second device including:

third storage means for storing a second reception record of the message send from the first device, fourth storage means for storing a second transmission record of the reception confirmation sent to the first device, second generating means for generating a second communication activity record matching the second reception record with the second transmission record, and second output means for indicating the second communication activity record.

20. The system of claim 19, wherein each of the first and second generating means generates the communication activity record by using an administrative number appended to the message.

21. The system of claim 19, wherein the message is facsimile data.

* * * * *